United States Patent
Ikeya et al.

(10) Patent No.: US 9,772,213 B2
(45) Date of Patent: Sep. 26, 2017

(54) LIQUID LEVEL DETECTOR

(71) Applicant: AISAN KOGYO KABUSHIKI KAISHA, Obu-shi (JP)

(72) Inventors: Masaki Ikeya, Obu (JP); Yuichi Manabe, Inazawa (JP); Sumito Takeda, Nagoya (JP)

(73) Assignee: AISAN KOGYO KABUSHIKI KAISHA, Obu-shi (JP)

(*) Notice: Subject to any disclaimer, the term of this patent is extended or adjusted under 35 U.S.C. 154(b) by 21 days.

(21) Appl. No.: 15/013,381

(22) Filed: Feb. 2, 2016

(65) Prior Publication Data
US 2016/0223385 A1 Aug. 4, 2016

(30) Foreign Application Priority Data
Feb. 4, 2015 (JP) ................................. 2015-020085

(51) Int. Cl.
*G01F 23/38* (2006.01)
(52) U.S. Cl.
CPC .................... *G01F 23/38* (2013.01)
(58) Field of Classification Search
CPC .......... B60K 2015/03217; G01F 23/38; G01F 23/32; G01F 23/34; G01F 23/363; G01F 23/54; G01F 23/36; G01F 23/62
See application file for complete search history.

(56) References Cited

U.S. PATENT DOCUMENTS 4,229,973 A * 10/1980 Hara ................. G01F 23/32
 73/317
6,161,711 A * 12/2000 Miceli ................. B65D 50/061
 215/206

(Continued)

FOREIGN PATENT DOCUMENTS

JP  2006-208211 A  8/2006
JP  2007-183241 A  7/2007

(Continued)

OTHER PUBLICATIONS

Korean Office Action (and English translation) issued for Korean Patent Application No. 10-2015-0185122, dated Apr. 20, 2017 (13 pages).

*Primary Examiner* — David A Rogers
(74) *Attorney, Agent, or Firm* — Shumaker, Loop & Kendrick, LLP

(57) ABSTRACT

A liquid level detector may include a rotator fixed to an arm, a magnet fixed to the rotator, and a supporter rotatably supporting the rotator. The supporter may include a body, and an outer circumference wall disposed along a rotation direction of the arm on an outer circumference side of the magnet. The rotator may include a cover covering an end part of the outer circumference wall, and an opposing wall opposing at least one of an inner circumference surface and an outer circumference surface of the outer circumference wall. A first clearance between the supporter and the magnet may communicate with an outer space via a second clearance between the outer circumference wall and the cover and a third clearance between the outer circumference wall and the opposing wall. The first clearance may be larger than at least one of the second clearance and the third clearance.

8 Claims, 4 Drawing Sheets

(56) References Cited

U.S. PATENT DOCUMENTS

| | | | |
|---|---|---|---|
| 6,401,533 B1* | 6/2002 | Gier | B60K 15/077 73/313 |
| 6,453,741 B1* | 9/2002 | Beck, II | G01F 23/38 340/623 |
| 6,564,632 B2* | 5/2003 | Ross, Jr. | G01F 23/38 73/290 R |
| 6,679,116 B2* | 1/2004 | Ross, Jr. | G01F 23/34 73/290 R |
| 6,851,315 B2* | 2/2005 | Bergsma | G01F 23/363 73/290 R |
| 6,976,394 B2* | 12/2005 | Kleinen | G01F 23/38 116/227 |
| 7,093,485 B2* | 8/2006 | Newman | G01F 23/32 73/317 |
| 7,165,450 B2* | 1/2007 | Jamnia | G01F 23/38 73/317 |
| 7,201,052 B2* | 4/2007 | Lee | G01F 23/38 73/317 |
| 7,377,163 B2* | 5/2008 | Miyagawa | G01F 23/38 73/305 |
| 7,458,261 B2* | 12/2008 | Miyagawa | G01F 23/363 73/290 R |
| 7,673,509 B2* | 3/2010 | Cochran | G01F 23/38 73/311 |
| 8,136,396 B2* | 3/2012 | Mundo | G01F 23/38 73/317 |
| 8,671,750 B2* | 3/2014 | Fukuhara | G01F 23/38 73/314 |
| 9,453,756 B2* | 9/2016 | Ogasawara | G01F 23/38 |
| 2004/0003660 A1* | 1/2004 | Fukuhara | G01F 23/38 73/319 |
| 2004/0182150 A1* | 9/2004 | Okada | G01F 23/36 73/313 |
| 2004/0231416 A1* | 11/2004 | Kumagai | G01F 23/38 73/313 |
| 2005/0103103 A1* | 5/2005 | Newman | G01F 23/32 73/313 |
| 2005/0146323 A1* | 7/2005 | Kleinen | G01R 33/07 324/207.26 |
| 2006/0272405 A1* | 12/2006 | Feher | G01F 23/38 73/313 |
| 2007/0090832 A1 | 4/2007 | Yasuda et al. | |
| 2007/0290681 A1* | 12/2007 | Yasuda | G01F 23/38 324/207.25 |
| 2008/0202231 A1* | 8/2008 | Sohn | G01F 23/38 73/317 |
| 2008/0231267 A1* | 9/2008 | Miyagawa | G01F 23/38 324/207.25 |
| 2010/0223993 A1* | 9/2010 | Shimizu | G01F 23/36 73/317 |
| 2011/0016970 A1* | 1/2011 | Sakamaki | G01F 23/363 73/317 |
| 2012/0011931 A1* | 1/2012 | Ichisawa | G01F 23/38 73/317 |
| 2012/0111108 A1* | 5/2012 | Hashimoto | G01F 23/363 73/317 |
| 2015/0107355 A1* | 4/2015 | Iryo | G01F 23/72 73/313 |
| 2015/0338263 A1* | 11/2015 | Iryo | G01F 23/38 73/317 |
| 2016/0161321 A1* | 6/2016 | Miyagawa | G01F 23/38 73/317 |
| 2016/0178427 A1* | 6/2016 | Tesar | G01F 23/38 73/313 |
| 2016/0313172 A1* | 10/2016 | Nakamura | F02M 37/106 |

FOREIGN PATENT DOCUMENTS

| | | |
|---|---|---|
| JP | 2007-315873 A | 12/2007 |
| JP | 2011-064491 A | 3/2011 |
| JP | 2015-087218 A | 5/2015 |
| JP | 2015-117968 A | 6/2015 |

\* cited by examiner

LIQUID LEVEL DETECTOR

CROSS-REFERENCE TO RELATED APPLICATION

This application claims priority to Japanese Patent Application No. 2015-020085 filed on Feb. 4, 2015, the contents of which are hereby incorporated by reference into the present application.

TECHNICAL FIELD

An art disclosed herein relates to a liquid level detector configured to detect a level of liquid (for example, a device configured to detect an amount of fuel stored in a fuel tank of an automobile or the like).

BACKGROUND

Japanese Patent Application Publication No. 2006-208211 discloses a liquid level detector that includes a float, an arm that revolves as the float moves, a body that has a revolving shaft of the arm, and a holder that houses a cylindrical-shape magnet. The holder covers the revolving shaft. A recessed portion is provided in the holder on an inner circumference side of the magnet, for allowing the revolving shaft to be fitted thereinto. The revolving shaft is fitted into the recessed portion to thereby allow the recessed portion to function as a bearing. A magnetism detecting element is disposed at the revolving shaft, for detecting changes in magnetic flux of the magnet that moves as the revolving arm revolves.

In this liquid level detector, a step portion of the body and/or a projecting portion of the holder complicate a route from an outside of the liquid level detector to the revolving shaft. Metal powders or the like in the fuel are thereby prevented from reaching the revolving shaft.

SUMMARY

In the above-described liquid level detector, there is a possibility that, even if the route from an outside of the liquid level detector to the revolving shaft is complicated, fine foreign substances may reach the revolving shaft. When fine foreign substances accumulate around the revolving shaft, a clearance between the revolving shaft and the holder is clogged with the foreign substances, resulting in that the arm can no longer revolve.

The present disclosure provides an art to suppress that foreign substances in a liquid interferes with a revolution of the arm.

The application discloses a liquid level detector. The liquid level detector may comprise: a float; an arm attached to the float and configured to convert a vertical motion of the float into a rotary motion of the arm; a rotator configured of a resin and fixed to the arm at a center of the rotary motion; a magnet fixed to the rotator; a supporter rotatably supporting the rotator; and a magnetic sensor covered by the supporter and configured to output a signal corresponding to a rotation of the magnet opposing the magnetic sensor via the supporter. The supporter may comprise: a body housing the magnetic sensor; and an outer circumference wall projecting from the body toward the rotator and disposed along a rotation direction of the arm on an outer circumference side of the magnet. The rotator may comprises: a cover covering an end part of the outer circumference wall, the end part located opposite to the body; and an opposing wall opposing at least one of an inner circumference surface and an outer circumference surface of the outer circumference wall and configured to slide relative to the outer circumference wall corresponding to the rotation of the arm. A clearance between the supporter and the magnet may communicate with an outer space of the liquid level detector via a clearance between the outer circumference wall and the cover and a clearance between the outer circumference wall and the opposing wall The clearance between the supporter and the magnet may be larger than at least one of the clearance between the outer circumference wall and the cover and the clearance between the outer circumference wall and the opposing wall.

In the above-described configuration, the clearance between the supporter and the magnet is larger than at least one of the clearance between the outer circumference wall and the cover and the clearance between the outer circumference wall and the opposing wall. Large foreign substances mixed with the fuel may not pass through the clearance between the outer circumference wall and the cover or the clearance between the outer circumference wall and the opposing wall, and hence may not reach the clearance between the supporter and the magnet. According to this configuration, relatively large foreign substances may be prevented from reaching the clearance between the supporter and the magnet. Moreover, in the above-described configuration, the rotator rotates while the outer circumference wall and the opposing wall slide. In other words, the opposing wall functions as a bearing of the rotator. The opposing wall and the outer circumference wall are opposed to each other on an outer circumference side of the magnet. According to this configuration, the opposing wall, which functions as the bearing, may be disposed at a position distant from the rotation center of the rotator, without making the magnet large. Consequently, with a vertical motion of the float, a relatively large moment may be generated at the opposing wall. Similarly, a relatively large moment may also be generated at the outer circumference wall. Accordingly, even if foreign substances are caught in the clearance between the outer circumference wall and the opposing wall or the clearance between the outer circumference wall and the cover, the moment generated by the vertical motion of the float can cause the rotator to rotate. It is possible to suppress foreign substances in the liquid interfering with a revolution of the arm.

DETAILED DESCRIPTION

Figure 1:
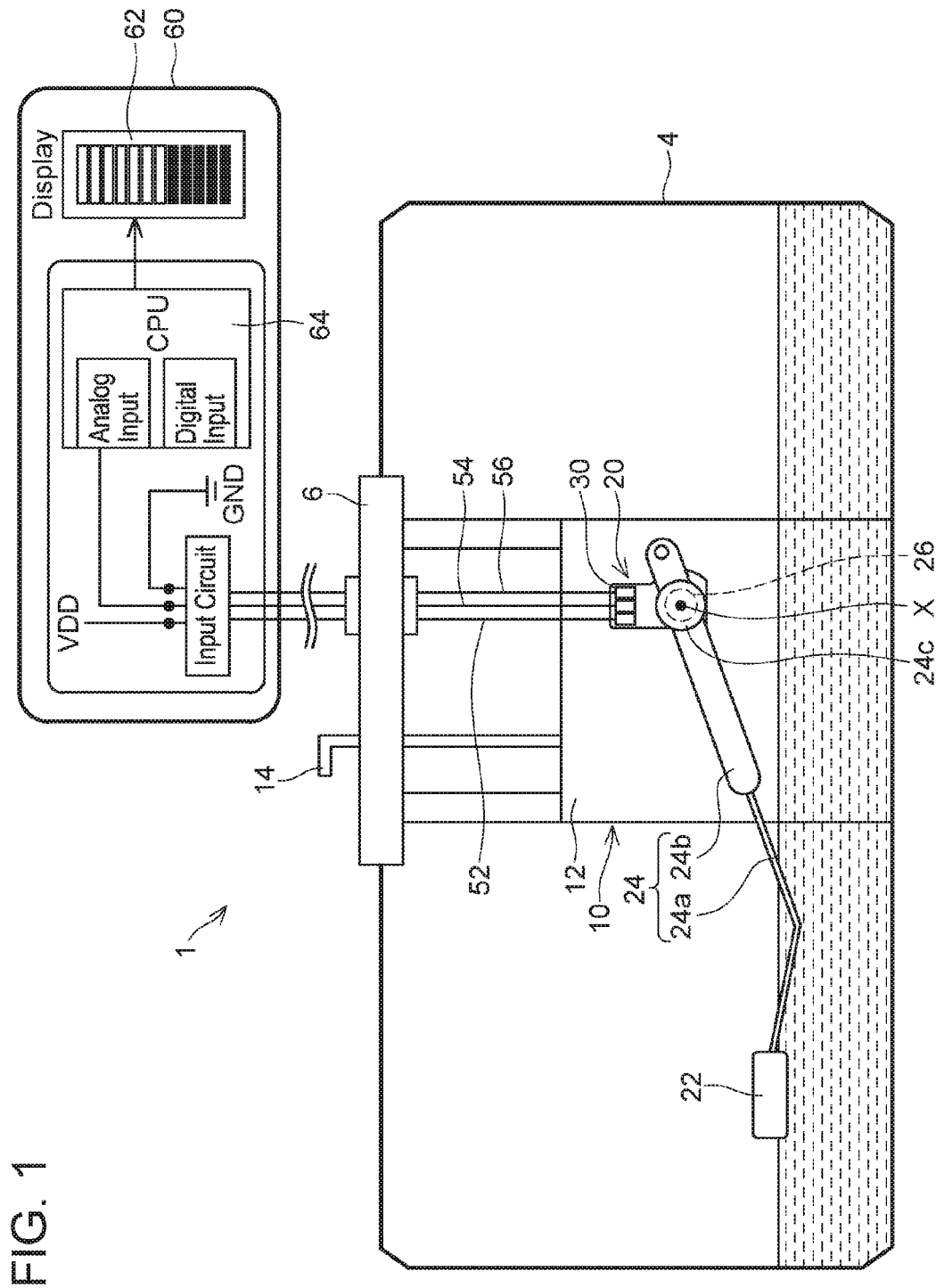
FIG. 1 shows a configuration of a fuel supply system.

Some features of embodiments described herein will be listed. Notably, technical features described herein are each independent technical element, and exhibit technical usefulness thereof solely or in combinations.

(Feature 1)

In a liquid level detector, an outer circumference surface of the opposing wall may oppose the inner circumference surface of the outer circumference wall. The clearance between the outer circumference wall and the cover may be smaller than the clearance between the outer circumference wall and the opposing wall. In this configuration, the clearance between the outer circumference wall and the cover may be located on the outer circumference side of the clearance between the outer circumference wall and the opposing wall. According to this configuration, it is possible to suppress foreign substances entering the clearance between the outer circumference wall and the opposing wall.

(Feature 2)

In the liquid level detector, an outer circumference surface of the opposing wall may oppose the inner circumference surface of the outer circumference wall. The magnet may be disposed along an inner circumference surface of the opposing wall. A part of the clearance between the outer circumference wall and the opposing wall may be larger than another part of the clearance between the outer circumference wall and the opposing wall. If the foreign substances that have entered the clearance between the opposing wall and the outer circumference wall are substances adsorbed by the magnet, such as iron powders, the substances are adsorbed by the magnet, which is held in the outer circumference wall, in the clearance between the opposing wall and the outer circumference wall. Consequently, a part of the clearance between the opposing wall and the outer circumference wall can be increased to thereby store the foreign substances adsorbed by the magnet. It is thereby possible to suppress the foreign substances, which are adsorbed by the magnet, interfering with the rotation of the arm.

(Feature 3)

In the liquid level detector, a storing space may be disposed on a route from the outer space of the liquid level detector to the clearance between the supporter and the magnet, via the clearance between the outer circumference wall and the cover and the clearance between the outer circumference wall and the opposing wall. The storing space may open toward an inflow direction of the liquid flowing through the route. According to this configuration, the foreign substances that enter the route can be stored in the storing space. It is thereby possible to suppress the foreign substances accumulating in each clearance.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid level detectors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

As shown in FIG. 1, a fuel supply system 1 is a system configured to supply, to an internal combustion engine not illustrated, fuel in a fuel tank 4 mounted in an automobile. In the present embodiment, the fuel is gasoline, or a mixed fuel containing gasoline and alcohol (e.g., ethanol). The fuel supply system 1 includes a fuel meter 60 and a fuel pump module 10. The fuel meter 60 is used for a display device of the automobile, not illustrated. The fuel pump module 10 is disposed in the fuel tank 4. The fuel meter 60 and the fuel pump module 10 are electrically connected by a plurality of lines 52, 54, and 56.

The fuel pump module 10 includes a fuel pump unit 12 and a fuel amount detector 20. The fuel pump unit 12 is housed in the fuel tank 4. The fuel pump unit 12 is attached to a set plate 6 configured to close an opening in the fuel tank 4. The fuel pump unit 12 sucks in the fuel in the fuel tank 4, pressurizes the fuel thus sucked in, and discharges the fuel. The fuel discharged from the fuel pump unit 12 is supplied to the engine through a discharge port 14.

The fuel amount detector 20 includes a float 22, an arm 24 to which the float 22 is fixed, and a magnetic sensor unit 30 configured to detect a rotation angle of the arm 24. The float 22 floats on the surface of the fuel in the fuel tank 4 and moves up and down depending on the liquid level of the fuel. The float 22 is rotatably attached to a leading end of the arm 24. A base end of the arm 24 is supported to be rotatable with respect to the magnetic sensor unit 30. For this reason, when the float 22 moves up and down depending on the liquid level of the fuel in the fuel tank 4, the arm 24 thereby swingably rotates with respect to the fuel pump unit 12.

The arm 24 includes a float attachment part 24a, a base part 24b, and a fulcrum part 24c. The float attachment part 24a is configured of a metal that has a resistance to fuel, such as stainless steel, for example. The float attachment part 24a is configured of a columnar rod-like member bent at an intermediate position. The float 22 is attached to a leading end of the float attachment part 24a. The base part 24b is fixed to a base end of the float attachment part 24a.

The base part 24b and the fulcrum part 24c are configured of a resin having a resistance to fuel (e.g., a polyphenylene sulfide resin (hereinafter referred to as "PPS")). The base part 24b has a flat-plate shape. The fulcrum part 24c is fixed to the base part 24b at an intermediate position. The fulcrum part 24c is rotatably supported by the magnetic sensor unit 30.

Figure 2:
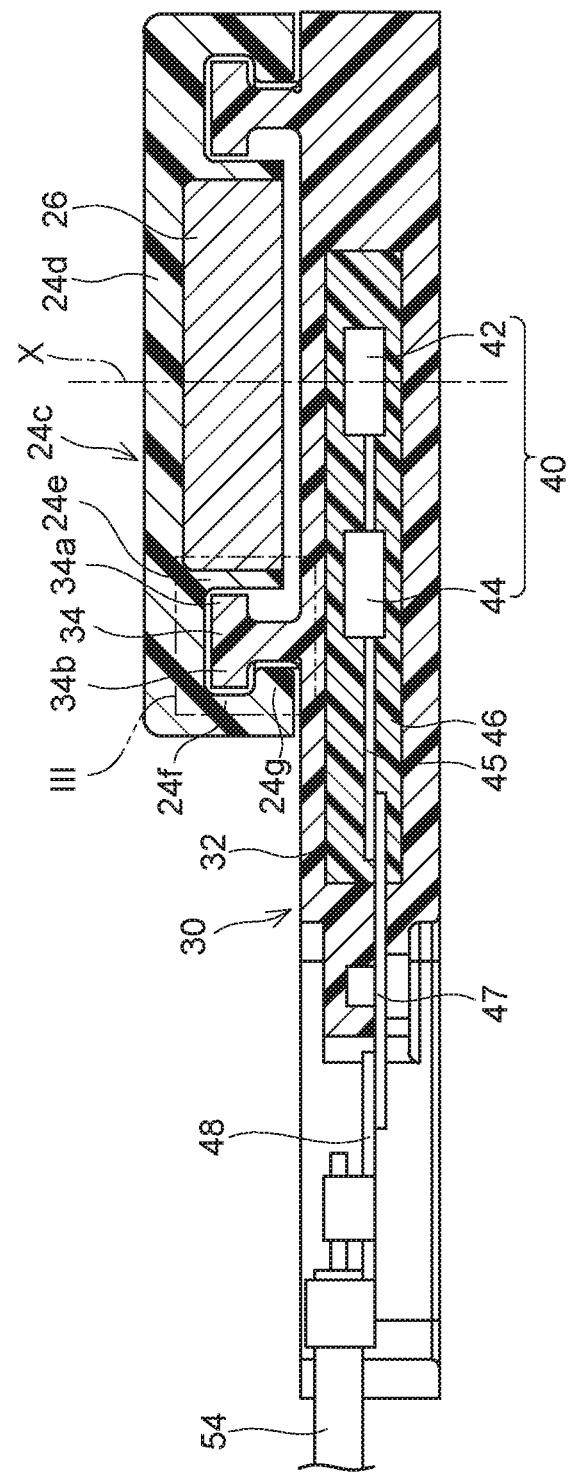
FIG. 2 shows a longitudinal cross-section of a magnetic sensor unit.

As shown in FIGS. 1 and 2, the fulcrum part 24c includes a cover 24d, an opposing wall 24e, and an engagement wall 24f. Notably, FIG. 2 shows a cross-sectional view of the magnetic sensor unit 30 and the fulcrum part 24c, and is a cross-sectional view that represents a cross-section in vertical directions (the vertical directions of FIG. 1), passing through a rotational axis X of FIG. 1. Moreover, the horizontal directions of FIG. 2 correspond to the vertical directions of FIG. 1. The cover 24d has a disk shape. The rotational axis X of the arm 24 coincides with a rotational axis of the cover 24d. The opposing wall 24e projects on a surface of the cover 24d on the magnetic sensor unit 30's side. The opposing wall 24e has a cylindrical shape. The central axis of the opposing wall 24e coincides with the rotational axis X. On an outer circumference side of the opposing wall 24e, the engagement wall 24f is disposed with a spacing from an outer circumference surface of the opposing wall 24e. The engagement wall 24f extends forming a circle along an outer circumference edge of the cover 24d. An engagement flange 24g of the engagement wall 24f on the magnetic sensor unit 30's side extends toward the rotational axis X. The engagement flange 24g is disposed along the entire circumference of the engagement wall 24f. Notably, in a variation, the engagement flange 24g may not be disposed along the entire circumference of the engagement wall 24f. For example, one engagement flange 24g may be disposed only at a portion of the engagement wall 24f in a circumference direction, or a plurality of the engagement flanges 24g may be disposed discretely at the engagement wall 24f in the circumference direction.

A magnet 26 is fitted into the inner circumference of the opposing wall 24e. The magnet 26 is fitted into an inner circumference surface of the opposing wall 24e. The magnet 26 is a permanent magnet. The magnet 26 has a disk shape. The center of the magnet 26 is located on the rotational axis X. The magnet 26 has an N pole in one semicircular part and an S pole in the other semicircular part. The magnet 26 rotates as the arm 24 swingably rotates. Consequently, an orientation of a magnetic field generated by the magnet 26 changes as the arm 24 swingably rotates.

The magnetic sensor unit 30 revolvably supports the arm 24. As shown in FIG. 2, the magnetic sensor unit 30 includes a body 32, an outer circumference wall 34, a cover portion 46, a magnetic sensor 40, and lead wires 45 and 47.

The body 32 is configured of a material having a low permeability to alcohol (PPS in the present embodiment). At the body 32, the outer circumference wall 34 that receives a part of the fulcrum part 24c of the arm 24 is disposed, the part housing the magnet 26. The outer circumference wall 34 has a cylindrical shape that has the central axis that coincides with the rotational axis X. The outer circumference wall 34 has an inner circumference flange 34a that extends toward an inner circumference side and an outer circumference flange 34b that extends toward an outer circumference side, at an end opposite to the body 32. Each of the inner circumference flange 34a and the outer circumference flange 34b has an annular shape that encircles the rotational axis X.

Figure 3:
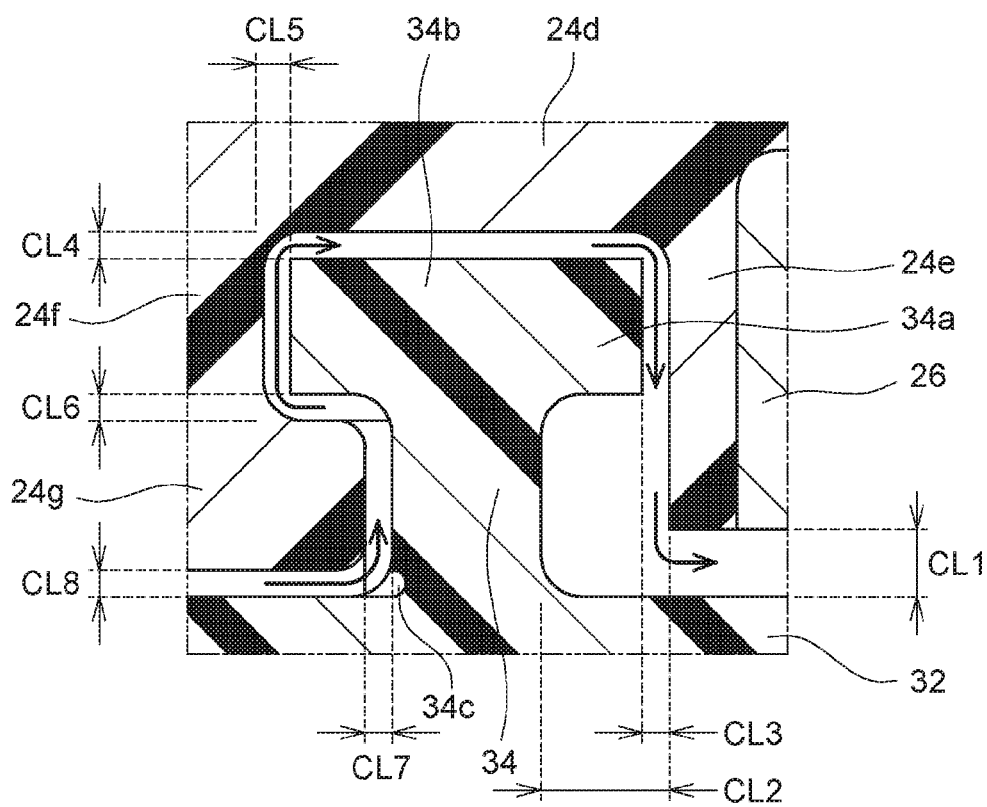
FIG. 3 shows an enlarged view of a region III of FIG. 2.

The opposing wall 24e is disposed on an inner circumference side of the outer circumference wall 34. An inner circumference surface of the outer circumference wall 34 and an outer circumference surface of the opposing wall 24e are opposed to each other with a clearance. As shown in FIG. 3, if the central axis of the outer circumference wall 34 and the center of the cover 24d are disposed on the rotational axis X, an inner circumference surface of the inner circumference flange 34a of the outer circumference wall 34 and the outer circumference surface of the opposing wall 24e are opposed to each other with a clearance CL3 that encircles the rotational axis X. In a part where no inner circumference flange 34a is disposed, in other words, in a part on the body 32's side with respect to the inner circumference flange 34a, the inner circumference surface of the outer circumference wall 34 and the outer circumference surface of the opposing wall 24e are opposed to each other along the entire circumference of the rotational axis X, with a clearance CL2 that encircles the rotational axis X. The clearance CL2 is larger than the clearance CL3.

As shown in FIG. 2, the outer circumference flange 34b engages with the fulcrum part 24c. The arm 24 is thereby supported so as not to fall off from the magnetic sensor unit 30. In particular, an end of the outer circumference wall 34 opposite to the body 32 is wholly covered by the cover 24d coupled to an end of the opposing wall 24e opposite to the body 32. The cover 24d spreads toward the outer circumference side with respect to the outer circumference wall 34. The outer circumference edge of the cover 24d is located on the outer circumference side of the outer circumference flange 34b. The engagement wall 24f that extends from the outer circumference edge of the cover 24d toward the body 32 encircles the rotational axis X while being opposed to the outer circumference flange 34b. The engagement flange 24g disposed at an end of the engagement wall 24f on the body 32's side is located on the body 32' side of the outer circumference flange 34b.

As shown in FIG. 3, the fulcrum part 24c and the outer circumference wall 34 are disposed with clearances CIA to CL7 in between. The clearance CIA is the one between an end of the outer circumference wall 34 opposite to the body 32 and a surface of the cover 24d on the body 32's side. The clearance CL5 is the one between an outer circumference edge of the outer circumference flange 34b and an inner circumference surface of the engagement wall 24f. The clearance CL6 is the one between a surface of the outer circumference flange 34b on the body 32' side and a surface of the engagement flange 24g opposite to the body 32. The clearance CL7 is the one between an inner circumference surface of the engagement flange 24g and an outer circumference surface of the outer circumference wall 34.

Notably, a surface of the engagement flange 24g on the body 32's side is disposed with a clearance CL8 between itself and the body 32.

The body 32 houses the magnetic sensor 40. The magnetic sensor 40 is housed in the body 32, while being covered by the cover portion 46. The cover portion 46 is configured of a material having a low permeability to gasoline (an epoxy resin in the present embodiment). The cover portion 46 is housed in the body 32 by being disposed in a molding die of the body 32, namely, by so-called insert molding, when the body 32 is to be molded.

The magnetic sensor 40 detects a rotary motion of the arm 24, and based on that detected result, outputs to the fuel meter 60 a signal that represents an analog amount corresponding to a liquid level of fuel stored in the fuel tank 4 (see FIG. 1). The signal that represents an analog amount is, for example, an analog voltage signal, a signal through PWM (an abbreviation of Pulse Width Modulation), a signal transmitted with use of digital communication such as CAN (an abbreviation of Controller Area Network) or LAN (an abbreviation of Local Area Network), and the like. The magnetic sensor 40 is a magnetic-type sensor that detects a rotation angle of the arm 24, and a known sensor that utilizes a Hall IC, for example, can be used therefor. Specifically, the magnetic sensor 40 includes a detecting circuit 42, and an input/output circuit 44 connected to the detecting circuit 42. The detecting circuit 42 has a Hall element that detects an orientation of a magnetic field of the magnet 26. The input/output circuit 44 has a capacitor. The entire surface of the magnetic sensor 40 is covered by the cover portion 46. The detecting circuit 42 is disposed on an end part side of the cover portion 46. In particular, the detecting circuit 42 is disposed at an end part opposite to an end on a side where the lead wire 47 described below penetrates the cover portion 46. The input/output circuit 44 is disposed approximately at the center of the cover portion 46.

The three lead wires 45 extend from the input/output circuit 44 on a side of the input/output circuit 44, opposite to the detecting circuit 42. Upper end parts of the three lead wires 45 are connected to lower end parts of the three lead wires 47, respectively. Upper end parts of the three lead wires 47 are connected to terminals 48 of the power source line 52, the output line 54, and the ground line 56, respectively. The power source line 52, the output line 54, and the ground line 56 penetrate the set plate 6 to thereby be connected to the fuel meter 60. The lead wires 45 and 47 and the terminals 48 are configured of a conductor having a high conductivity (copper in the present embodiment).

The magnetic sensor 40 is covered by the cover portion 46 by being disposed in a molding die of the cover portion 46, namely, by the so-called insert molding, when the cover portion 46 is to be molded. The lead wires 45 are covered by the cover portion 46. Moreover, end parts of the lead wires 47 on the lead wires 45's side are covered by the cover portion 46. The lead wires 47 extend from connecting positions of the lead wires 47 and 45, respectively, in a direction separating away from the magnetic sensor 40, penetrate the cover portion 46 and the body 32, and are exposed to an outside of the body 32.

The fuel meter 60 has a CPU 64 and a display 62. The CPU 64 supplies electric power to the fuel liquid level detector 20, particularly to the magnetic sensor 40, via the power source line 52. The signal output from the magnetic sensor 40 is input to the CPU 64 via the output line 54. The CPU 64 uses the signal input from the magnetic sensor 40, determines an amount of fuel stored in the fuel tank 4, and displays on the display 62 the fuel amount thus determined. The CPU 64 and the display 62 can be configured as in the ones in the conventionally-known fuel meter, respectively. Notably, the ground line 56 is grounded in the CPU 64.

(Liquid Amount Detecting Method)

Next, a liquid amount detecting method will be described. The CPU 64 supplies electric power to the magnetic sensor 40 while the automobile is driven (i.e., while the engine is running). The magnetic sensor 40 outputs a signal corresponding to an orientation of a magnetic field of the magnet 26. When the liquid level of the fuel in the fuel tank 4 changes, the float 22 moves in vertical directions, and the arm 24 rotates as the float 22 moves in the vertical directions. The magnet 26 rotates on its own axis as the arm 24 rotates. Consequently, the orientation of the magnetic field of the magnet 26 changes depending on the rotation of the arm 24, in other words, the liquid level of the fuel in the fuel tank 4. Accordingly, the signal output from the magnetic sensor 40 is correlated with the liquid level of the fuel in the fuel tank 4.

When the signal output from the magnetic sensor 40 is input to the CPU 64, the CPU 64 determines an amount of fuel stored in the fuel tank 4, and displays on the display 62 the fuel amount thus determined. In particular, the CPU 64 uses a database or a function that is stored in the CPU 64 and shows a relation between a signal output from the magnetic sensor 40 and a fuel amount, to thereby determine the fuel amount. The database or the function is predetermined by execution of an experiment or a simulation, and stored in the CPU 64.

(Relations Among the Clearances CL1 to CL8)

The clearance CL1 between the body 32 and the magnet 26 is surrounded by the outer circumference wall 34. The clearance CL1 communicates with an outer space of the fuel liquid level detector 20 via the clearances CL2 to CL8.

In the state where the fulcrum part 24c is located at a reference position in a direction vertical to the rotational axis X (i.e., as shown in FIG. 2, a position where the central axis of the magnet 26 supported by the fulcrum part 24c coincides with the central axis of the outer circumference wall 34), a width of the clearance CL3 (hereinafter referred to as a "width W1") is provided to extend so as to form a circle along a rotation direction of the arm 24. At this time, each of the clearances CL5 and CL7 (hereinafter referred to as a "width W1+α") is larger than the clearance CL3.

The opposing wall 24e and the inner circumference flange 34a slide to thereby cause the arm 24 to rotate relative to the body 32. In other words, the opposing wall 24e functions as a bearing of the arm 24. According to this configuration, the bearing of the arm 24 can be disposed at an outer circumference of the magnet 26. Consequently, without making the magnet 26 large, a diameter of the bearing can be increased.

If the arm 24 rotates, the size of the clearance CL3 becomes 0 at a sliding section of the opposing wall 24e and the inner circumference flange 34a, whereas the width of the clearance CL3 becomes twice as large as the width W1 (hereinafter referred to as "W1×2") at a section opposite to that sliding section with the rotational axis X interposed therebetween. On the other hand, the width of each of the clearances CL5 and CL7 becomes a width W1+α+W1 on an outer circumference side of the position where the width of the clearance CL3 is a width 0, and becomes a width a on an outer circumference side of the position where the width of the clearance CL3 is the width W1×2.

In the state where the fulcrum part 24c is located at a reference position in a rotational axis X's direction (i.e., a position where the clearances CL4 and CL6 are identical), the width of each of the clearances CL4 and CL6 (hereinafter referred to as a width "W2") is smaller than the width of the clearance CL1 (hereinafter referred to as a width "W3"), and smaller than the width of the clearance CL8 (hereinafter referred to as a width "W4"). Moreover, if the fulcrum part 24c is located at the reference position in the rotational axis X's direction, the width W3 of the clearance CL1 is smaller than the width W4 of the clearance CL8. In this configuration, the fulcrum part 24c moves relative to the magnetic sensor unit 30 in the rotational axis X's direction, by a width twice as large as the width W2 of the clearances CL4 and CL6.

In the situation where the fulcrum part 24c is located both at the reference position in the direction vertical to the rotational axis X, and at the reference position in the rotational axis X's direction, the width W2 of each of the clearances CL4 and CL6 is smaller than the width W1 of the clearance CL3.

In the configuration in the present embodiment, as shown by an arrow of FIG. 3, the fuel passes through the clearances CL8, CL7, CL6, CL5, CL4, CL3, and CL2 in this order, and reaches the clearance CL1. If foreign substances are mixed with the fuel, the foreign substances pass through the clearance CL8. A storing groove 34c that opens toward the clearance CL8 is disposed in the outer circumference wall 34. The storing groove 34c is disposed to extend so as to form a circle along the rotation direction of the arm 24. The foreign substances that have passed through the clearance CL8 flow into the storing groove 34c along a flow of the fuel. A portion of the foreign substances mixed with the fuel is thereby stored in the storing groove 34c. Consequently, it is possible to suppress the foreign substances entering the clearances CL1 to CL7, which are located downstream of the clearance CL8.

Moreover, it is possible to suppress the foreign substances that are not stored in the storing groove 34c and flow downstream from the clearance CL7 entering downstream of the clearance CL4, by means of the clearances CL6 and CL4 that have a relatively small width. Consequently, the foreign substances can be prevented from entering the clearances CL1 to CL3.

Furthermore, when the arm 24 rotates, a larger moment is generated in the clearances CL6 and CL4 than in the clearances CL1 to CL3. Accordingly, hindrance to the arm 24's rotation due to foreign substances being caught in the arm 24's clearances can be prevented more effectively in the case where the foreign substances are caught in the clearances CL6 and CL4 than in the case where the foreign substances are caught in the clearances CL1 to CL3.

Out of the foreign substances that have reached downstream of the clearance CL3, the ones adsorbed by the magnet, such as iron powders, are adsorbed by the magnet 26 onto the outer circumference surface of the opposing wall 24e. The clearance CL2, which has a width larger than that of the clearance CL3, is disposed downstream of the clearance CL3. The foreign substances adsorbed by the magnet 26 are stored in the clearance CL2. It is thereby possible to suppress the foreign substances adsorbed by the magnet 26 from being caught in the clearances CL2 and CL3.

(Variation 1)

In the above-described embodiment, the opposing wall 24e and the inner circumference flange 34a slide to thereby cause the arm 24 to rotate relative to the body 32. However, the engagement wall 24f and the outer circumference flange 34b may slide to thereby cause the arm 24 to rotate relative to the body 32. In this case, the width of the clearance CL5 may be smaller than that of each of the clearances CL3 and CL7. In the present variation, the engagement wall 24f is an example of the "opposing wall". In the present variation, the inner circumference surface of the outer circumference wall 34 may not be opposed to the opposing wall 24e.

(Variation 2)

In the above-described embodiment, in the case where the fulcrum part 24c is located at the reference position in the direction vertical to the rotational axis X, the width of the clearance CL3 is larger than that of each of the clearances CL5 and CL7. However, the width of the clearance CL3 may be identical to at least one of the widths of the clearances CL5 and CL7. If the width of the clearance CL3 is identical to the width of the clearance CL5, the opposing wall 24e and the inner circumference flange 34a may slide and the engagement wall 24f and the outer circumference flange 34b may slide, to thereby cause the arm 24 to rotate relative to the body 32. If the width of the clearance CL3 is identical to the clearance CL7, the opposing wall 24e and the inner circumference flange 34a may slide and the engagement wall 24f (particularly the engagement flange 24g) and the outer circumference wall 34 may slide, to thereby cause the arm 24 to rotate relative to the body 32.

(Variation 3)

In the above-described embodiment, in the case where the fulcrum part 24c is located both at the reference position in the direction vertical to the rotational axis X and at the reference position in the rotational axis X's direction, the width of each of the clearances CL1 to CL8 is entirely uniform. However, the width of each of the clearances CL1 to CL8 may not be entirely uniform. For example, the width of the clearance CL2 may be identical to the width of the clearance CL3, partially in the rotation direction of the arm 24.

(Variation 4)

In the above-described embodiment, the engagement wall 24f extends so as to form a circle along the outer circumference edge of the cover 24d. However, the engagement wall 24f may not extend as aforementioned along the outer circumference edge of the cover 24d, and may be disposed discretely at the outer circumference edge of the cover 24d.

(Variation 5)

In the above-described embodiment, the storing groove 34c is formed at an end of the outer circumference wall 34 on the body 32's side. However, the position of the storing groove 34c is not limited thereto. For example, the storing groove 34c may be formed in the outer circumference flange 34b. In this case, the storing groove 34c may open toward the clearance CL7.

(Variation 6)

In each of the above-described embodiments, the magnet 26 is exposed from the fulcrum part 24c. However, the magnet 26 may be housed in the fulcrum part 24c. In the present variation, a clearance between the body 32 and a surface of the fulcrum part 24c on the body 32's side that covers a surface of the magnet 26 on the body 32's side is an example of the "clearance between the supporter and the magnet".

(Variation 7)

The "liquid level detector" in the present disclosure may be a device that detects an amount of liquid in a container, for example, an amount of water stored in a water storage tank, and the like, other than the fuel amount detector 20 that detects the amount of fuel in the fuel tank 4.

(Variation 8)

In the above-described embodiment, the magnetic sensor 40 outputs to the fuel meter 60 a signal related to an analog amount corresponding to a liquid level of the fuel stored in the fuel tank 4. The CPU 64 in the fuel meter 60 then uses the signal that has been output from the magnetic sensor 40 and represents the analog amount, to determine a fuel amount. However, the magnetic sensor 40 may convert the analog amount corresponding to the liquid level of the fuel stored in the fuel tank 4 into a fuel amount, and output to the CPU 64 a signal corresponding to the fuel amount. The magnetic sensor 40 may convert the analog amount into the fuel amount, with a technique similar to that of the CPU 64 in the above-described embodiment. The CPU 64 may determine the fuel amount from the signal corresponding to the fuel amount, which has been input from the magnetic sensor 40, and display on the display 62 the fuel amount thus determined.

(Variation 9)

Figure 4:
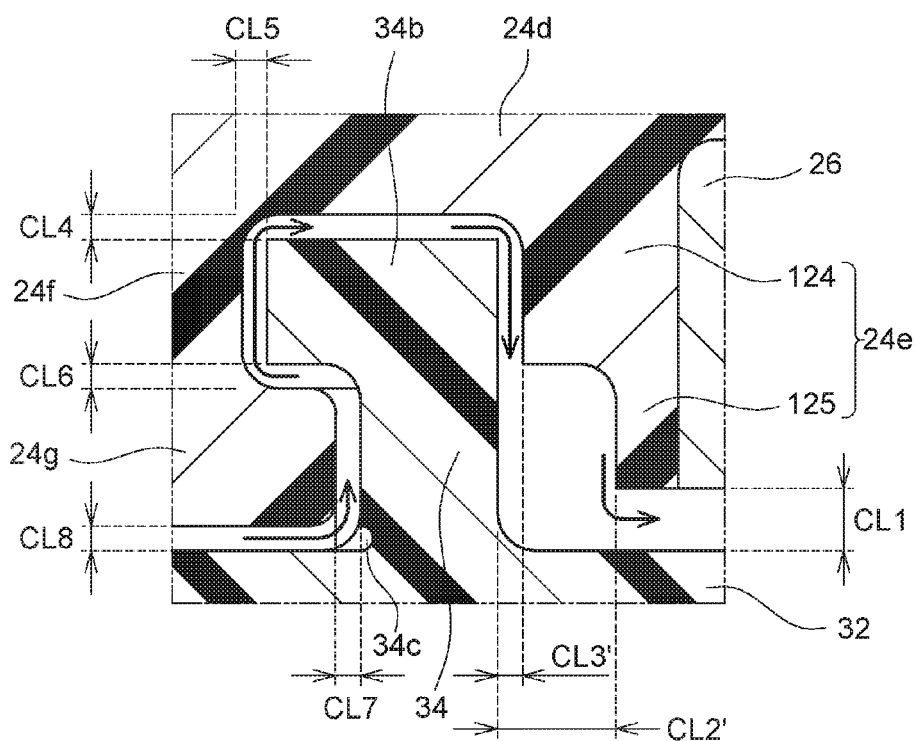
FIG. 4 shows an enlarged view of a region at the same position as that of the region III of FIG. 2 in the magnetic sensor unit in a variation.

In the above-described embodiment, the opposing wall 24e of the arm 24 has a cylindrical shape that has a uniform thickness along the rotational axis X's direction. However, the cylindrical shape may not have a uniform thickness along the direction of the rotational axis X of the opposing wall 24e. For example, as shown in FIG. 4, at the opposing wall 24e, two cylindrical portions 124 and 125 that have widths different from each other may be disposed adjacently in the rotational axis X's direction. The cylindrical portion 124 may be disposed on the cover 24d's side, in other words, on an upstream side, of the cylindrical portion 125. An inner diameter of the cylindrical portion 124 may be equal to an inner diameter of the cylindrical portion 125, and an outer diameter of the cylindrical portion 124 may be larger than an outer diameter of the cylindrical portion 125. In this case, the outer circumference wall 34 may not have the inner circumference flange 34a. In other words, the outer circumference wall 34 may have an inner circumference surface that is spaced from the rotational axis X by a constant distance on its entire surface. The clearance CL2' between the inner circumference surface of the outer circumference wall 34 and an outer circumference surface of the cylindrical portion 125 may be larger than a clearance CL3' between the inner circumference surface of the outer circumference wall 34 and an outer circumference surface of the cylindrical portion 124.

What is claimed is:

1. A liquid level detector comprising:
a float;
an arm attached to the float and configured to convert a vertical motion of the float into a rotary motion of the arm;
a rotator configured of a resin and fixed to the arm at a center of the rotary motion;
a magnet fixed to the rotator;
a supporter rotatably supporting the rotator; and
a magnetic sensor covered by the supporter and configured to output a signal corresponding to a rotation of the magnet opposing the magnetic sensor via the supporter,
wherein
the supporter comprises:
a body housing the magnetic sensor; and
an outer circumference wall projecting from the body toward the rotator and disposed along a rotation direction of the arm on an outer circumference side of the magnet,
the rotator comprises:
a cover covering an end part of the outer circumference wall, the end part located opposite to the body; and
an opposing wall opposing at least one of an inner circumference surface and an outer circumference surface of the outer circumference wall and configured to slide relative to the outer circumference wall corresponding to the rotation of the arm,
a clearance between the supporter and the magnet communicates with an outer space of the liquid level detector via a clearance between the outer circumference wall and the cover and a clearance between the outer circumference wall and the opposing wall, and
the clearance between the supporter and the magnet is larger than at least one of the clearance between the outer circumference wall and the cover and the clearance between the outer circumference wall and the opposing wall.

2. The liquid level detector as in claim 1, wherein
an outer circumference surface of the opposing wall opposes the inner circumference surface of the outer circumference wall, and
the clearance between the outer circumference wall and the cover is smaller than the clearance between the outer circumference wall and the opposing wall.

3. The liquid level detector as in claim 1, wherein
an outer circumference surface of the opposing wall opposes the inner circumference surface of the outer circumference wall,
the magnet is disposed along an inner circumference surface of the opposing wall, and
a part of the clearance between the outer circumference wall and the opposing wall is larger than another part of the clearance between the outer circumference wall and the opposing wall.

4. The liquid level detector as in claim 1, wherein
a storing space is disposed on a route from the outer space of the liquid level detector to the clearance between the supporter and the magnet, via the clearance between the outer circumference wall and the cover and the clearance between the outer circumference wall and the opposing wall, and
the storing space opens toward an inflow direction of the liquid flowing through the route.

5. The liquid level detector as in claim 1, wherein
the opposing wall is disposed outside of the outer circumference wall,
an inner circumference surface of the opposing wall opposes the outer circumference surface of the outer circumference wall, and
the clearance between the outer circumference wall and the cover is smaller than the clearance between the outer circumference wall and the opposing wall.

6. The liquid level detector as in claim 5, wherein
another opposing wall is further disposed inside of the outer circumference wall,
an outer circumference surface of the other opposing wall opposes the inner circumference surface of the outer circumference wall, and
the clearance between the outer circumference wall and the cover is smaller than the clearance between the outer circumference wall and the other opposing wall.

7. The liquid level detector as in claim 5, wherein
the outer circumference wall comprises an outer circumference flange extending toward an outer circumference side of the outer circumference wall, and
the opposing wall comprises an engagement flange extending toward an inner circumference side of the opposing wall between the outer circumference flange and the body.

8. The liquid level detector as in claim 7, wherein
a clearance between the outer circumference wall and the engagement flange is smaller than the clearance between the supporter and the magnet.

* * * * *